United States Patent
Duval

(10) Patent No.: US 6,976,515 B2
(45) Date of Patent: Dec. 20, 2005

(54) MODULAR DRIVE WHEEL FOR LOG PROCESSORS, DELIMBERS AND SINGLE GRIP HARVESTERS

(76) Inventor: Alain Duval, 4215E, 11th Street North East, Calgary (CA) T2E 6K4

( * ) Notice: Subject to any disclaimer, the term of this patent is extended or adjusted under 35 U.S.C. 154(b) by 217 days.

(21) Appl. No.: 10/677,331

(22) Filed: Oct. 3, 2003

(65) Prior Publication Data

US 2004/0250918 A1    Dec. 16, 2004

Related U.S. Application Data

(60) Provisional application No. 60/445,226, filed on Feb. 6, 2003.

(30) Foreign Application Priority Data

Apr. 30, 2003   (CA)   .................................. 2427253

(51) Int. Cl.[7] .............................................. B27L 1/00
(52) U.S. Cl. ................................ 144/208.5; 144/208.1
(58) Field of Search ....................... 144/208.1, 208.7, 144/208.5

(56) References Cited

U.S. PATENT DOCUMENTS

| | | | |
|---|---|---|---|
| 3,088,504 A | * | 5/1963 | Stihl et al. ............... 144/208.1 |
| 3,286,746 A | * | 11/1966 | Eriksson ................ 144/208.1 |
| 3,563,288 A | * | 2/1971 | Brownell ................. 144/338 |
| 4,222,420 A | | 9/1980 | Karlsson |
| 4,239,067 A | | 12/1980 | Mononen |
| 4,257,461 A | | 3/1981 | Wangeby et al. |
| 4,304,275 A | * | 12/1981 | Glover .................... 144/208.9 |
| 4,972,890 A | | 11/1990 | Isley |
| 5,082,036 A | | 1/1992 | Vierikko |
| 5,094,281 A | * | 3/1992 | Barnhill et al. .......... 144/208.7 |
| 5,152,328 A | | 10/1992 | Arvidsson |
| 5,511,596 A | * | 4/1996 | Wardell et al. .......... 144/208.7 |
| 5,524,685 A | * | 6/1996 | Barnhill et al. .......... 144/208.1 |
| 5,570,732 A | | 11/1996 | Andreasson |
| 5,735,325 A | | 4/1998 | Timperi et al. |
| 6,345,651 B1 | * | 2/2002 | Havimaki et al. ....... 144/24.13 |

FOREIGN PATENT DOCUMENTS

WO    WO 01/47672 A1    7/2001

* cited by examiner

*Primary Examiner*—Bena Miller
(74) *Attorney, Agent, or Firm*—Antony C. Edwards

(57) ABSTRACT

The modular drive wheel for log processors includes a tubular midsection sandwiched between a pair of annular rings mounted concentrically on opposite ends of the midsection. The midsection has a resilient outer surface extending around the midsection. The pair of annular rings each have a radially spaced apart array of notches therearound. The notches in the radially spaced apart arrays of notches are sized to snugly receive in releasable locking engagement therein links on opposite ends of chain segments extending between the pair of annular rings. The drive wheel further includes means mounted between the pair of annular rings for selectively forcing apart the pair of annular rings along a longitudinal axis of symmetry of the midsection.

21 Claims, 7 Drawing Sheets

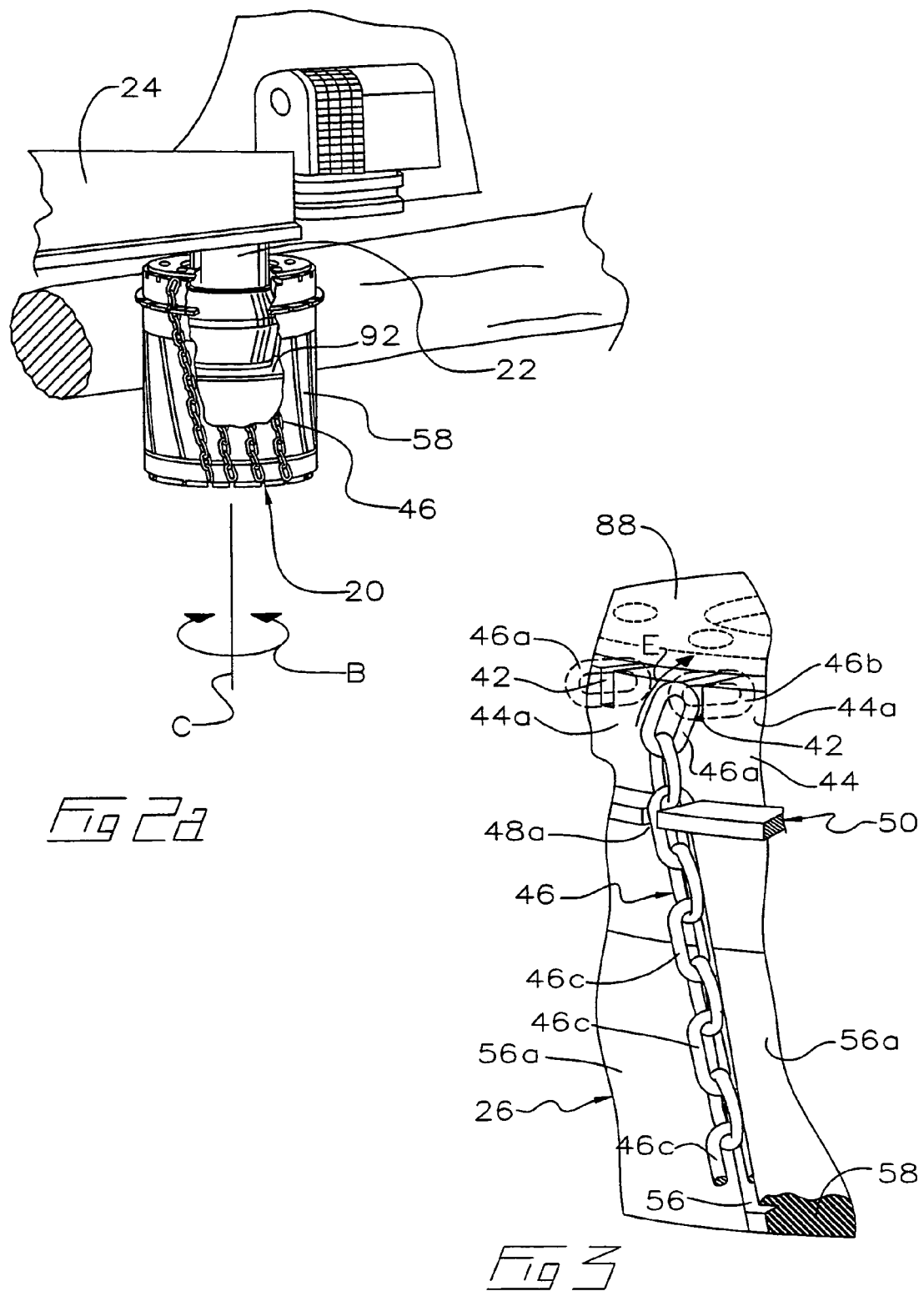

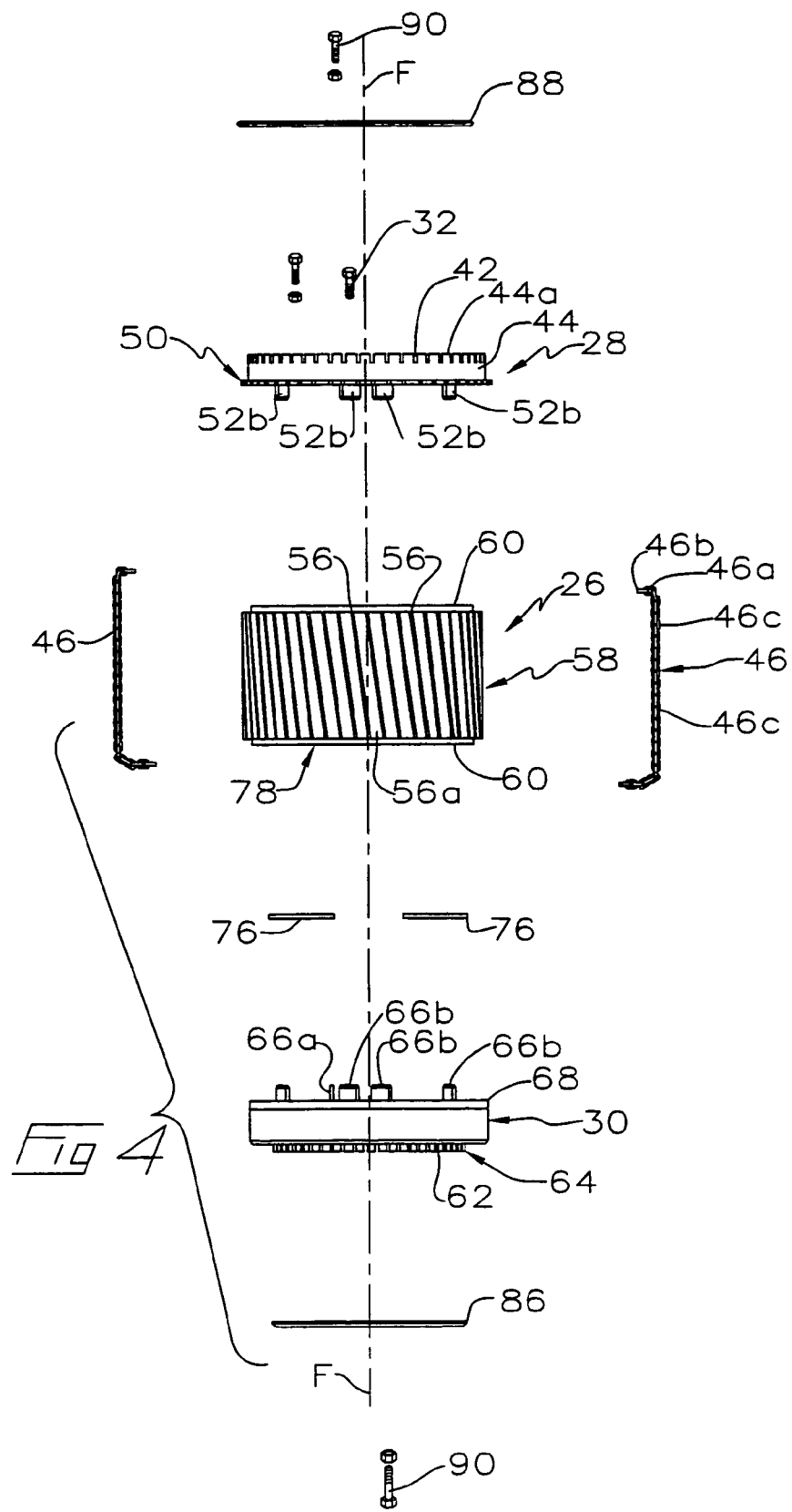

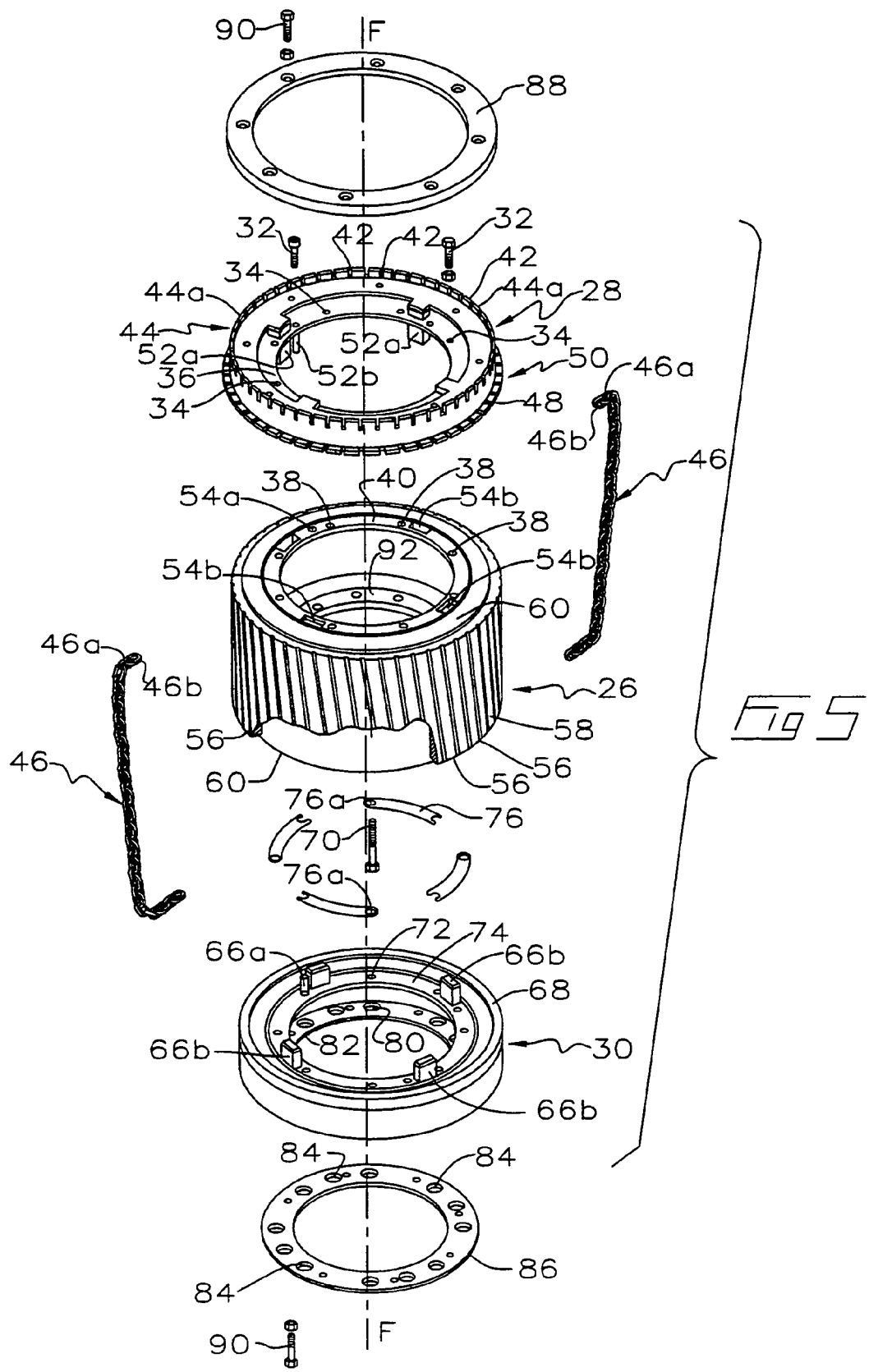

MODULAR DRIVE WHEEL FOR LOG PROCESSORS, DELIMBERS AND SINGLE GRIP HARVESTERS

CROSS REFERENCE TO RELATED APPLICATION

This application claims priority from U.S. Provisional Patent Application No. 60/445,226 filed Feb. 6, 2003 entitled Modular Drive Wheel for Log Processors/Delimbers and Canadian Patent Application No. 2,427,253 filed Apr. 30, 2003 entitled Modular Drive Wheel for Log Processors, Delimbers and Single Grip Harvesters.

FIELD OF THE INVENTION

This invention relates to the field of log processors, delimbers and single grip harvesters and in particular, for use thereon, to an improved drive wheel of modular construction.

BACKGROUND OF THE INVENTION

It is well known in the prior art to use log delimbers, processors, single grip harvesters and other log processing machines (hereinafter collectively referred to as processors) for example in the form of attachments for mounting to the distal end of the boom and stick of an excavator for the delimbing and processing of felled trees. Conventionally, the delimber attachment picks up one end of a felled tree or, when the trees are of smaller diameter, gathers the ends of a plurality of trees so as to place the end of the tree or trees between a pair of drive wheels mounted on opposite sides of the tree or trees. A pair of grappling arms hold the ends of the trees between the drive wheels and up against an elongate supporting frame to which are mounted the grappling arms and the drive wheels. With the grappling arms hugging the trees up against the support frame so as to dispose the ends of the trees between the drive wheels, the drive wheels are actuated so as to snugly frictionally engage opposite sides of the tree or trees therebetween and driven so as to run the tree or trees longitudinally along their length thereby causing the arms to strip the branches. The tree or trees so longitudinally driven by the pair of wheels may be subject to repeated passes through the arms by the reversing of the drive direction of the wheels so as to produce a reciprocating stroke of the tree trunks until the operator is satisfied with the result. The frame may also support a remotely actuable saw for cutting the trunks, once delimbed, into lengths.

In the prior art, the drive wheels may conventionally be for example either entirely rigid wheels whose outer surface are covered by spikes or other grip enhancing means, or may be rubber sheathed wheels employing chain wrapped around the inner and outer surfaces of the wheel. The chains are wrapped to produce a torus-like protective cover around the rubber and so that the wrapped strand of chain enhances the grip of the rubber drive wheel engaging the tree trunks being held in the delimber. It is this latter type of wheel which is the subject of the improvements according to the present invention.

The conventional rubber wheels used in conjunction with a wrapped chain are one piece wheels. Consequently, as the chain during use wears and stretches, the chain becomes more loosely wrapped around the wheel and consequently increases the rate of erosion of the rubber outer liner on the wheel beyond that normally encountered when the chain is tight, resulting in the premature wear of the rubber outer liner and a shortened useful life of the rubber outer liner before the entire wheel must be replaced and the worn wheels sent for expensive refurbishing. Of course, operators may, and should, periodically tighten the chain wrap to take up the slack in the chain due to wear and stretching so as to extend the useful life of the rubber wheel. However, in reality, because this is quite a time consuming exercise involving having to remove the entire wheel from the delimber and thereby causing significant down time of the equipment, operators often will not perform such periodic tightening of the chain. Consequently, it is one object of the present invention to assist operators in more simply and quickly tightening lengths of chain mounted onto the modular rubber drive wheel of the present invention and to provide for ease of interchangeability of parts of the drive wheel which are subject to wear.

SUMMARY OF THE INVENTION

In summary, the modular drive wheel for log processors of the present invention includes a tubular midsection sandwiched between a pair of annular rings mounted concentrically on opposite ends of the midsection. The midsection has a resilient outer surface extending around the midsection. The pair of annular rings each have a radially spaced apart array of notches therearound. The notches in the radially spaced apart arrays of notches are sized to snugly receive in releasable locking engagement therein links on opposite ends of chain segments extending between the pair of annular rings. The drive wheel further includes means mounted between the pair of annular rings for selectively forcing apart the pair of annular rings along a longitudinal axis of symmetry of the midsection.

A radially spaced apart array of grooves may extend substantially longitudinally along the midsection so as to be substantially parallel to the longitudinal axis of symmetry of the midsection. The grooves are formed in the resilient outer surface of the midsection. The grooves are aligned with corresponding notches in the radially spaced apart arrays of notches. The arrays of notches are in oppositely disposed relation to each other on oppositely disposed ends of the pair of annular rings.

A plurality of chain segments are mounted or mountable around the midsection in a radially spaced apart array. Each chain segment of the plurality of chain segments is mounted substantially parallel to the longitudinal axis of the midsection and has a length which is long enough to extend from being releasably locked into a corresponding notch at one end of the each chain segment, and, at the other end of the each chain segment, releasably locked into a corresponding oppositely disposed notch so as to align each chain segment along a corresponding groove of the array of grooves.

In one embodiment, one annular ring of the pair of annular rings further comprises a skirt ring mounted thereto. The skirt ring extends around the annular rings, around a base of the annular ring. The skirt ring has a radially spaced apart array of notches therearound for releasably mating with a chain link, where the chain link is one of the links between opposite end links of each of the chain segments when the chain segments are mounted around the midsection in a radially spaced array of chain segments each substantially parallel to the longitudinal axis of the midsection. The notches assist in guiding the links in the chain segments into mating alignment with corresponding grooves in the array of grooves around the midsection. In one embodiment, the radially spaced apart arrays of grooves on the midsection may be equally radially spaced apart. The notches on the pair of annular rings may then also be equally radially spaced apart. The radially spaced apart array of grooves may be formed as parallel helical spirals helically spiralling about the longitudinal axis.

In one embodiment of the present invention, the means for forcing apart the pair of annular rings may include a telescoping mounting means telescopically mounting a first annular ring of the annular rings to the midsection. The skirt ring may be mounted to a second annular ring of the pair of annular rings opposite to the first annular ring. The telescopic mounting means may include a first annular flange concentrically rigidly mounted within the first annular ring, a second annular flange concentrically rigidly mounted within the midsection and selectively adjustable spacing means, for selectively adjusting a longitudinal spacing between the first and second annular flanges, mounted between the first and second annular flanges. Further, spacing means may include a threaded member threadably engaging corresponding threaded apertures in the first and second annular flanges, and also may include removably mountable rigid spacers removably mountable between the first and second annular flanges.

In a preferred embodiment, the end ring which may be telescopically translated relative to the midsection also has a resilient outer surface therearound, and the radial array of notches are recessed radially inwardly of the resilient band so that the corresponding ends of the chain segments must be tensioned across the resilient band so as to lockably engage into the notches. In this fashion, the resilient band serves to resiliently apply a tensioning force to the chain segments to assist in taking up minor slack in the chain segments due to wear and stretch in between periodic adjustments in the telescopic relationship between the midsection and the end ring which may be telescopically translated.

Both end rings are provided with locking rings which may be mounted over the notches to lock the end chain links of the chain segments into the end ring notches.

The spiralled or slanted array of chain segments on the drive wheels thereby urge logs in the delimber in a direction against the frame of the delimber.

BRIEF DESCRIPTION OF THE DRAWINGS

FIG. 2a is, in enlarged partially cutaway view, one drive wheel of the invention of FIG. 1.

FIG. 3 is a partially cut away enlarged view of a portion of FIG. 2.

FIG. 4 is an exploded view inside elevation of the drive wheel of FIG. 2.

FIG. 5 is an exploded perspective view of the drive wheel of FIG. 2.

DETAILED DESCRIPTION OF EMBODIMENTS OF THE INVENTION

Figure 1:
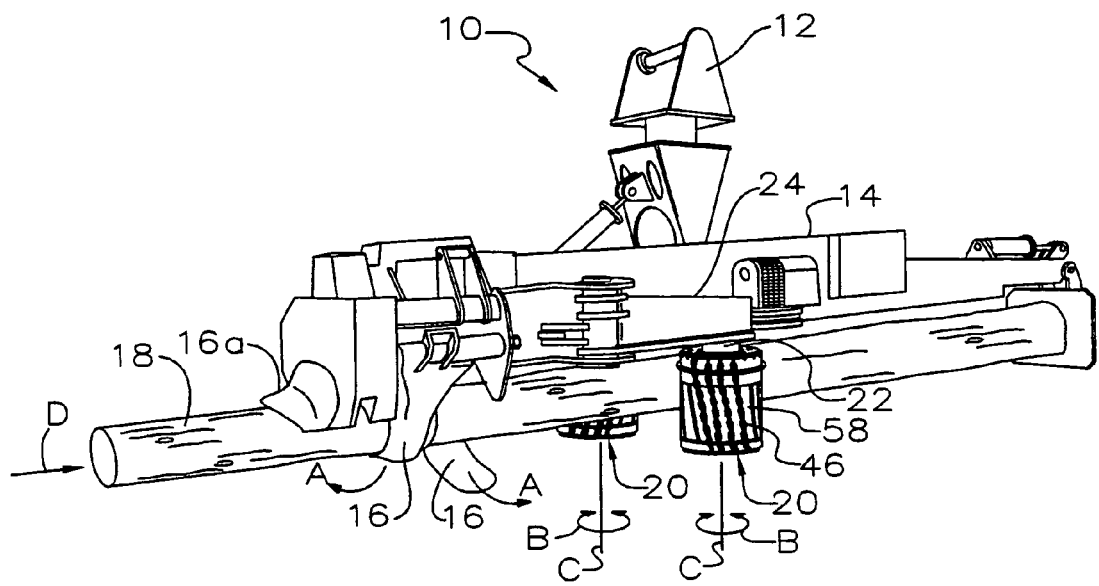
FIG. 1 is, in perspective view, a log delimber and processor having the modular drive wheels according to the present invention mounted thereon.

As seen in the accompanying figures wherein similar characters of reference denote corresponding parts in each view, the log processor 10 of FIG. 1 includes a coupler 12 for mounting support frame 14 to the remote end of a work arm such as the end of the boom and stick of an excavator (not shown). An opposed facing pair of arms 16 are pivotally mounted to frame 14 and are remotely actuable so as to grasp a tree trunk 18 or plurality of tree trunks 18 in a simultaneous "hugging" or grappling motion in direction A so as to engage trunk 18 adjacent and parallel to the longitudinal axis of frame 14. Hereinafter reference to a singular tree trunk is meant to include also the plural.

Figure 2:
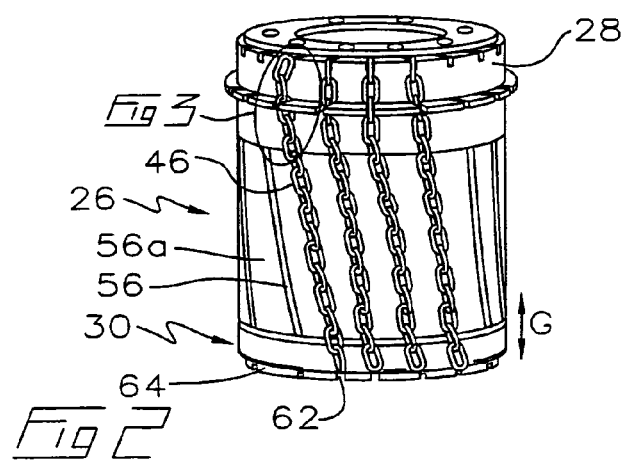
FIG. 2 is, in perspective view, one of the modular drive wheels of FIG. 1.

A pair of drive wheels 20, better seen in FIG. 2, are rotatably mounted on hydraulic wheel motors 22, as conventionally available and better seen in FIG. 2a, to a pair of corresponding cantilevered arms 24 which may be remotely actuated so as to pivot or otherwise so as to bring the outer surfaces of drive wheels 20 into engagement with tree trunk 18.

Conventionally, although this is not intended to be limiting, drive motors (not shown) are mounted within drive wheels 20 on annular flanges 92 so as to selectively rotate drive wheels 20 in directions B about axes of rotation C. Simultaneous rotation of drive wheels 20 translates tree trunk 18 in direction D. Translation of tree trunk 18 along its longitudinal axis in direction D causes arms 16 and top knife 16a to cut off any branches protruding from the trunk as the arms and top knife cut the branches during the stroke of the tree trunk between the drive wheels.

As seen in the assembled view of FIG. 2, the enlarged view of FIG. 3 and the exploded side elevation and perspective views, respectively, of FIGS. 4 and 5, the modular drive wheel according to the present invention includes a rubber sheathed midsection 26 sandwiched between a first end ring 28 and an oppositely disposed second end ring 30. The rubber sheath may be for example two inches thick. First or top end ring 28 is mounted by means of bolts 32, only two of which are illustrated, through bolt holes 34 in inner annular flange 36 and through corresponding bolt holes 38 through inner annular flange 40 on the corresponding end of midsection 26.

Figure 6:
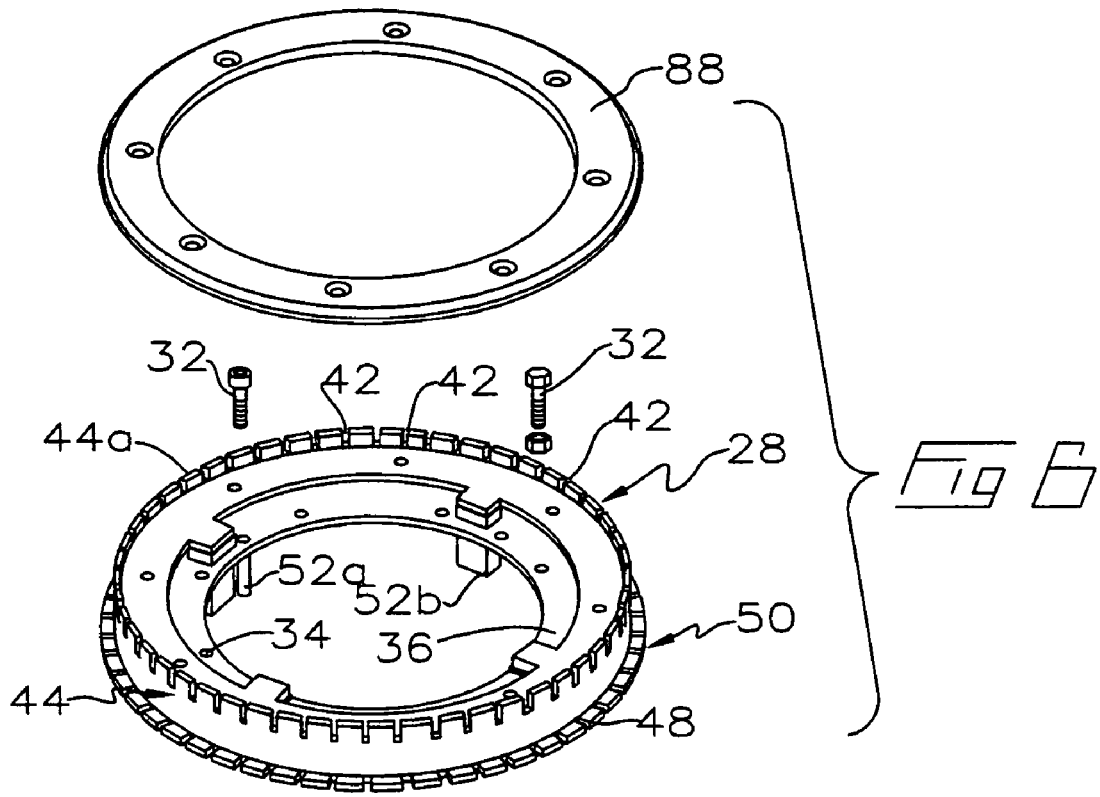
FIG. 6 is an enlarged view of a portion of FIG. 5.
Figure 8:
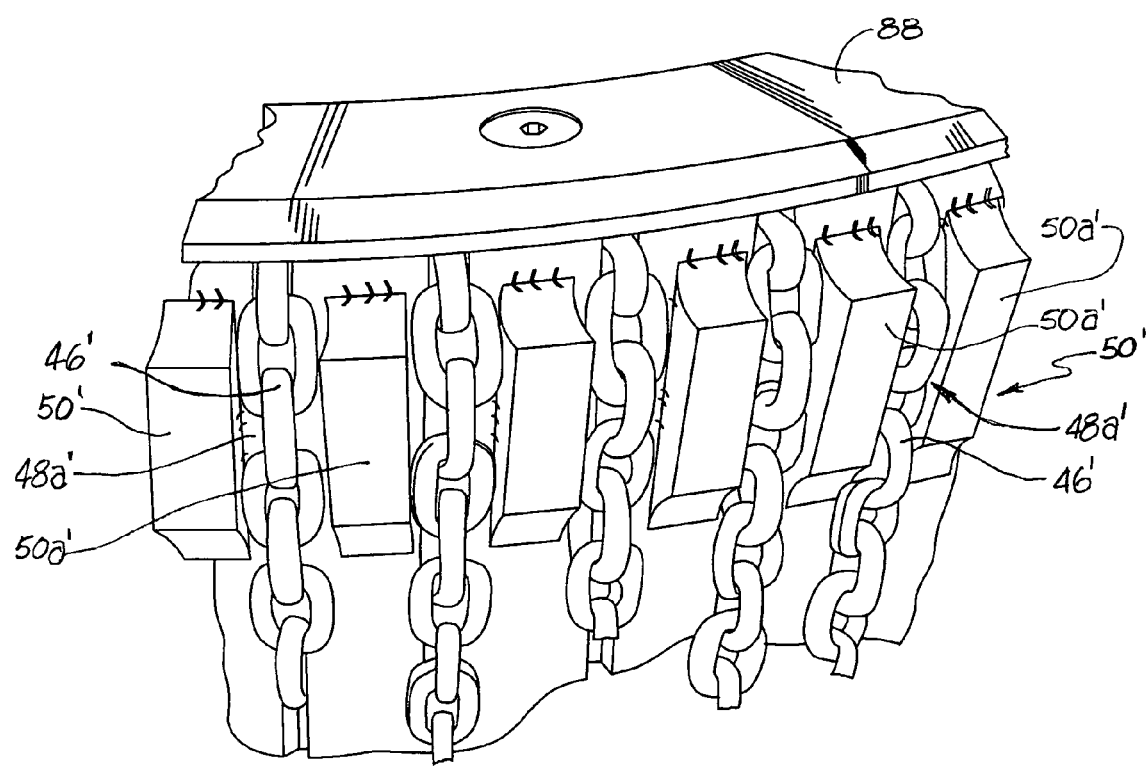
FIG. 8 is, in enlarged partially cut-away view, an alternative preferred embodiment of the annular guide ring of the drive wheel according to the present invention.

A first equally radially spaced apart array of notches 42, better seen in the enlarged view of FIG. 6, are formed in an upstanding annular rim 44 concentric with inner annular flange 36 on first end ring 28 so as to thereby form a corresponding first equally radially spaced apart array of upstanding rigid teeth 44a into which the penultimate end link 46a on the corresponding first ends of chain segments 46 may be lockably and removably mated. In particular as better seen in FIG. 3, the penultimate end link 46a is being engaged in direction E so as to mate into the corresponding notch 42 thereby locking the adjacent end-most link 46b behind the teeth 44a on either side of notch 42. In FIG. 3 the penultimate end link 46a illustrated in dotted outline is also mated into the corresponding notch 42. With penultimate end links 46a of chain segments 46 mated into their corresponding notches 42 chain segments 46 are mated with notches 48a formed between teeth 48 in annular guide ring 50 formed as an orthogonally oriented skirt relative to and around the base of rim 44. In one embodiment, fifty chain segments 46 may be mounted around a drive wheel 20. In an alternative preferred embodiment as seen in FIG. 8, the annular guide ring may advantageously be an annular equally radially spaced array of lugs 50a' forming a ring 50' of such lugs wherein lugs 50*a'* do not protrude radially outwardly beyond the outermost edges of links 46' mounted in notches 48*a'*.

First end ring 28 is properly oriented onto midsection 26 by the mating of a pin or dowel 52*b* with a corresponding aperture 54*a* formed in inner annular flange 40, where pin 52*b* depends from inner annular flange 36. Lugs 52*a* slidably and snugly mate into corresponding slots 54*b*. Lugs 52*a* are mounted to, and depend from, inner annular flange 36. Slots 54*b* are formed in inner annular flange 40.

The proper alignment of first end ring 28 relative to midsection 26 about the axis of substantial symmetry F is important so as to properly align notches 42 in rim 44 and notches 48*a* in annular guide ring 50 with helically spiralled or slanted grooves 56, which define therebetween raised lands 56*a*, in the rubber exterior surface or sheath 58 radially encasing the inner rigid, for example steel, core tube or sleeve or collar 60 of midsection 26. Grooves 56 are sized so as to snugly receive in releasable mounting engagement therein alternating chain links 46*c* so that chain segments 46 once mounted into and along their corresponding grooves 56 in rubber sheath 58 are thereby guided and urged so as to maintain the parallel equally spaced apart spiralled or slanted array of chain segments 46 as seen in FIGS. 1 and 2. It is understood that the array of chain segments would continue all the way around the outer surface of each drive wheel 20 to provide a continuous or endless traction-enhanced surface on drive wheels 20 so as to engage tree trunk 18 as the drive wheels are rotated.

Figure 7:
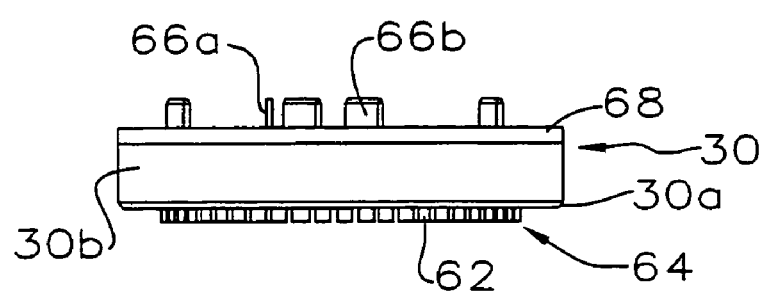
FIG. 7 is an enlarged view of the bottom ring of FIG. 4.

In a manner similar to the locking of penultimate links 46*a* into notches 42 in ring 44, the corresponding links at the opposite ends of chain segments 46 slidably mate into corresponding notches 62 better seen in the enlarged view of FIG. 7 formed in rim 64 protruding from the base of second end ring 30.

Second or bottom end ring 30, similar to first end ring 28, is aligned relative to midsection 26 so as to properly align notches 62 with the corresponding ends of grooves 56 to thereby keep the chain segments 46 properly aligned, by the use of a bayonet mounting of dowel or pin 66*a* and lugs 66*b*, wherein dowel or pin 66*a* mates with a corresponding hole on annular flange 78 on the bottom of midsection core 60 and lugs 66*b* mate with correspondingly sized slots in annular flange 78 on the opposite end of core 60 from annular flange 40.

Second or bottom end ring 30 is mounted in a telescopic fit onto midsection 26 so that, with the pin 66*a* and lugs 66*b* bayonet mounted into flange 78, rim 68 overlaps in a telescopic fit over the corresponding exposed bottom end of core 60. The telescopic fit of second end ring 30 onto midsection 26 provides for relative movement in direction G between second end ring 30 and midsection 26. This telescopic fit allows the periodic tensioning of chain segments 46 mounted so as to extend between the first and second end rings, that is, so as to take up any slack produced by wear and stretch of the chain segments during use of the drive wheel. Tensioning of chain segments 46 is accomplished by translating second end ring 30 along axis F in a direction away from midsection 26, although a small amount of tension is maintained by reason of the outermost surface of end ring 30 being resilient; the chain segments resiliently deforming a bevelled edge 30*a* of the resilient surface 30*b* as they pass over the resilient surface 30*b* into locking engagement within notches 62 in rim 64. Because links 46*c* of chain segments 46 are mounted into grooves 56 of sheath 58, in order to keep the links flush in the grooves as the chain segment transitions from sheath 58 and over outer surface 30*b* of ring 30, the outside diameter of outer surface 30*b* is equal to the outside diameter of sheath 58 less the depth of grooves 56, that is, is flush with the radially-inner bottom of the grooves.

Figure 5A:
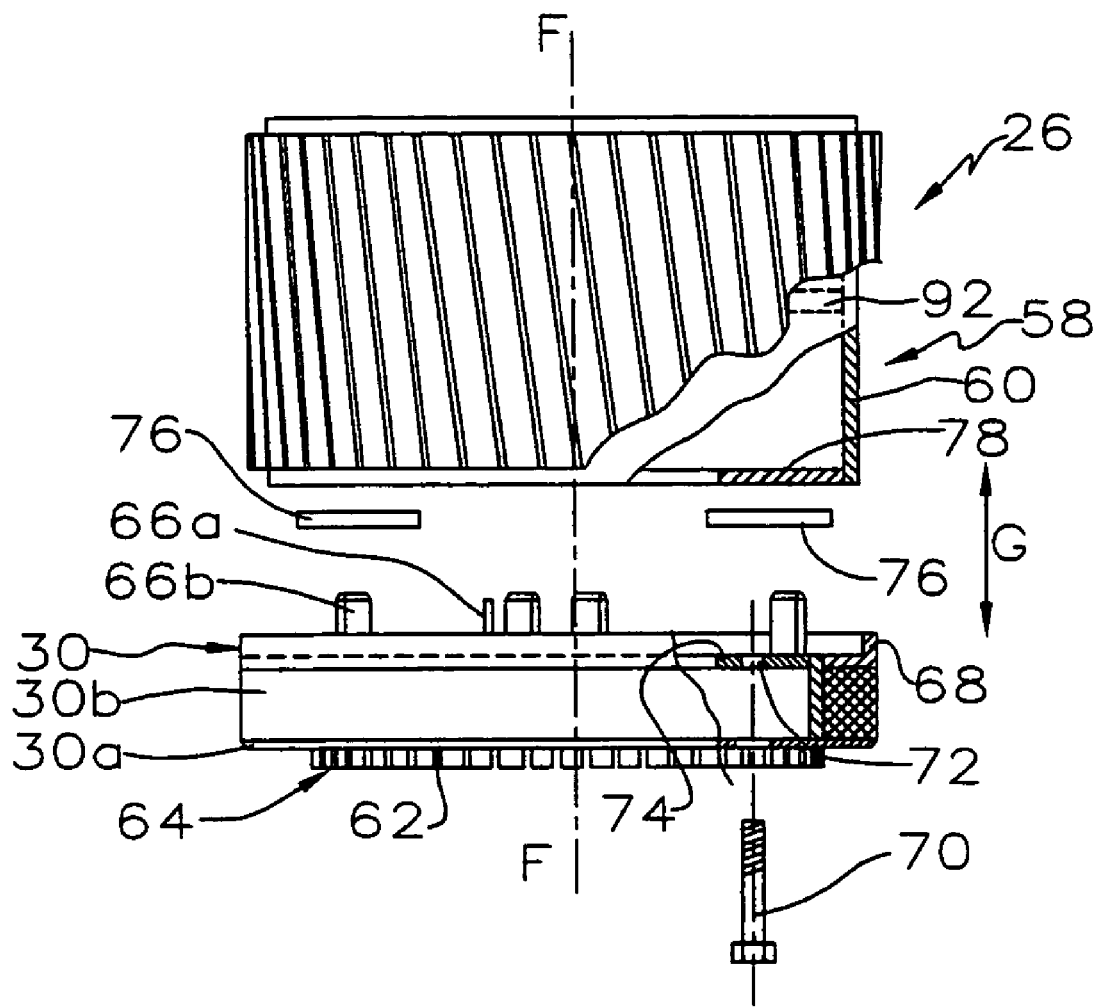
FIG. 5a is an enlarged partially cut away view taken from the exploded view of FIG. 4.

Translation of end ring 30 along axis F may be accomplished by the use of jacking bolts 70 better seen in FIG. 5*a*, only one of which is illustrated, which mount through threaded bolt holes 72 in the inner annular ring 74, and through corresponding holes 76*a* in shims 76 so as to engage, by pushing up against, annular flange 78 on the bottom of core 60. Thus with bolts 70 threadably engaged in corresponding threaded holes in annular flange 72 and pushing up against flange 78 on the exposed end of core 60, bolts 70 may be tightened so as to telescopically translate second end ring 30 away from midsection 26 thereby tensioning chain segments 46. Forcing flanges 72 and 78 apart allows for the snug insert of shims 76. With shims 76 in place, bolts 70 may be un-tightened so that the tensioning of chain segments 46 is maintained by pressure on shims 76. For ease of access to bolts 70 for the periodic tensioning of chain segments 46, apertures 80 are provided in the inner flange 82 of second end ring 30 and apertures 84 are provided in locking collar 86 which mounts over rim 64 so as to lock the ends of chain segments into notches 62. Thus an operator may adjust jacking bolts 70 from the lower exposed ends of drive wheels 20 without having to remove drive wheels 20 from wheel motors 22.

A locking collar 88 is provided so as to similarly lock the opposite ends, that is links 46*a* and 46*b* of chain segments 46 into notches 42 in rim 44, collars 86 and 88 being releasably mountable onto their corresponding end rings by the use of bolts 90.

A further annular flange 92 is mounted within midsection 26 to provide a base onto which are mounted wheel motors 22. When assembled, the wheel motors rotate the drive wheels relative to arms 24.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A modular drive wheel for log processors comprising:
    a tubular midsection sandwiched between a pair of annular rings mounted concentrically on opposite ends of said midsection,
    wherein said midsection has a resilient outer surface extending around said midsection,
    wherein said pair of annular rings each have a radially spaced apart array of notches therearound, and wherein said notches in said radially spaced apart arrays of notches are sized to snugly receive in releasable locking engagement therein links on opposite ends of chain segments extending between said pair of annular rings, said drive wheel further comprising means mounted between said pair of annular rings for selectively forcing apart said pair of annular rings along a longitudinal axis of symmetry of said midsection wherein said wheel is adapted for use in log processors.

2. The device of claim 1 further comprising a radially spaced apart array of grooves extending substantially longitudinally along said midsection so as to be substantially parallel to said longitudinal axis of symmetry of said midsection, wherein said grooves are formed in said resilient outer surface of said midsection, and wherein said grooves are aligned with corresponding notches in said radially spaced apart arrays of notches, said arrays of notches in oppositely disposed relation to each other on oppositely disposed ends of said pair of annular rings.

3. The device of claim 2 further comprising a plurality of chain segments mounted around said midsection in a radially spaced apart array, each chain segment of said plurality of chain segments substantially parallel to said longitudinal axis and having a length which is long enough to extend from being releasably locked into a corresponding said notch at one end of said each chain segment, and, at the other end of said each chain segment, releasably locked into a corresponding oppositely disposed said notch so as to align said each chain segment along a corresponding groove of said array of grooves.

4. The device of claim 2 wherein one annular ring of said pair of annular rings further comprises a skirt ring mounted thereto and extending therearound from a base thereof, said skirt ring having a radially spaced apart array of notches therearound for releasably mating with a link between opposite end links of each of said chain segments when a plurality of said chain segments are mounted around said midsection, in a radially spaced array of chain segments each substantially parallel to said longitudinal axis, so as to guide links in said chain segments into mating alignment with corresponding grooves in said array of grooves around said midsection.

5. The device of claim 2 wherein said radially spaced apart arrays of grooves on said midsection are equally radially spaced apart and wherein said notches on said pair of annular rings are equally radially spaced apart.

6. The device of claim 4 wherein said means for forcing apart said pair of annular rings includes a telescoping mounting means telescopically mounting a first annular ring of said annular rings to said midsection.

7. The device of claim 6 wherein said telescopic mounting means includes a first annular flange concentrically rigidly mounted within said first annular ring, a second annular flange concentrically rigidly mounted within said midsection and selectively adjustable spacing means, for selectively adjusting a longitudinal spacing between said first and second annular flanges, mounted between said first and second annular flanges.

8. The device of claim 7 wherein said spacing means includes a threaded member threadably engaging corresponding threaded apertures in said first and second annular flanges.

9. The device of claim 8 wherein said spacing means includes removably mountable rigid spacers removably mountable between said first and second annular flanges.

10. The device of claim 2 wherein said radially spaced apart array of grooves are formed as parallel helical spirals helically spiralling about said longitudinal axis.

11. The device of claim 6 wherein said skirt ring is mounted to a second annular ring of said pair of annular rings opposite to said first annular ring.

12. A modular drive wheel for log processors comprising:
a tubular midsection sandwiched between a pair of annular rings mounted concentrically on opposite ends of said midsection,
wherein said midsection has a resilient outer surface extending around said midsection,
a plurality of chain segments mounted around said midsection in a radially spaced apart array, each chain segment of said plurality of chain segments substantially parallel to said longitudinal axis and having releasably locking into a corresponding said notch at one end of said each chain segment, and, at the other end of said each chain segment, releasably locking into a corresponding oppositely disposed said notch,
wherein said notches in said radially spaced apart arrays of notches are sized to snugly receive in releasable locking engagement therein links on opposite ends of chain segments extending between said pair of annular rings,
said drive wheel further comprising means mounted between said pair of annular rings for selectively forcing apart said pair of annular rings along said longitudinal axis wherein said wheel is adapted for use in log processors.

13. The device of claim 12 further comprising a radially spaced apart array of grooves extending substantially longitudinally along said midsection so as to be substantially parallel to a longitudinal axis of symmetry of said midsection, wherein said grooves are formed in said resilient outer surface of said midsection, and wherein each annular ring of said pair of annular rings having a radially spaced apart array of notches there-around, said grooves are aligned with corresponding notches in said radially spaced apart arrays of notches, said arrays of notches in oppositely disposed relation to each other on oppositely disposed ends of said pair of annular rings.

14. The device of claim 12 wherein one annular ring of said pair of annular rings further comprises a skirt ring mounted thereto and extending therearound from a base thereof, said skirt ring having a radially spaced apart array of notches therearound for releasably mating with a link between opposite end links of each of said chain segments when a plurality of said chain segments are mounted around said midsection, in a radially spaced array of chain segments each substantially parallel to said longitudinal axis, so as to guide links in said chain segments into mating alignment with corresponding grooves in said array of grooves around said midsection.

15. The device of claim 12 wherein said radially spaced apart arrays of grooves on said midsection are equally radially spaced apart and wherein said notches on said pair of annular rings are equally radially spaced apart.

16. The device of claim 14 wherein said means for forcing apart said pair of annular rings includes a telescoping mounting means telescopically mounting a first annular ring of said annular rings to said midsection.

17. The device of claim 16 wherein said telescopic mounting means includes a first annular flange concentrically rigidly mounted within said first annular ring, a second annular flange concentrically rigidly mounted within said midsection and selectively adjustable spacing means, for selectively adjusting a longitudinal spacing between said first and second annular flanges, mounted between said first and second annular flanges.

18. The device of claim 17 wherein said spacing means includes a threaded member threadably engaging corresponding threaded apertures in said first and second annular flanges.

19. The device of claim 18 wherein said spacing means includes removably mountable rigid spacers removably mountable between said first and second annular flanges.

20. The device of claim 12 wherein said radially spaced apart array of grooves are formed as parallel helical spirals helically spiralling about said longitudinal axis.

21. The device of claim 16 wherein said skirt ring is mounted to a second annular ring of said pair of annular rings opposite to said first annular ring.

* * * * *